June 30, 1936.   G. R. MAUPIN   2,045,787
TOOL FOR ROLLING MULTIPLE BEARING SURFACES
Original Filed July 5, 1934
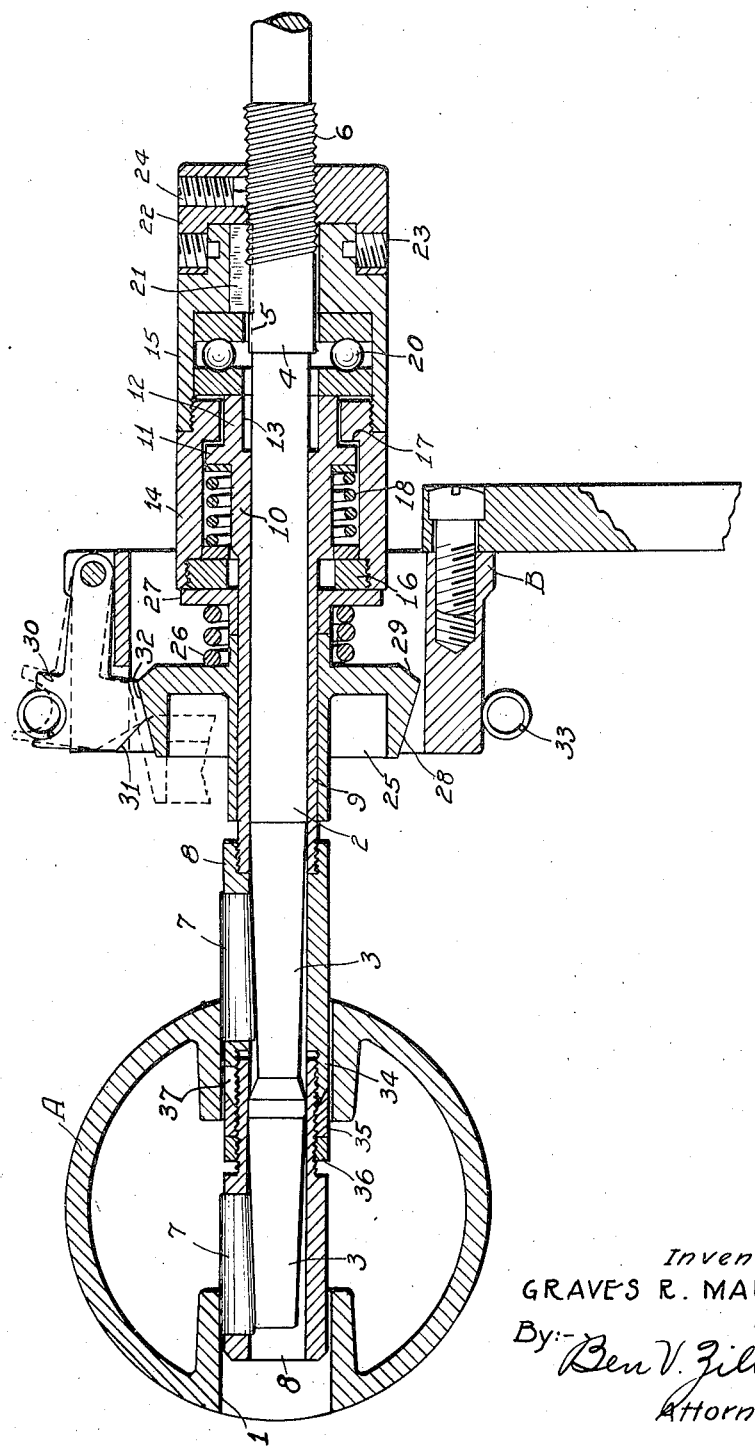
Inventor
GRAVES R. MAUPIN
By:- Ben V. Zillman
Attorney Patented June 30, 1936

2,045,787

UNITED STATES PATENT OFFICE 2,045,787

TOOL FOR ROLLING MULTIPLE BEARING SURFACES

Graves R. Maupin, Moberly, Mo., assignor to The J. Faessler Mfg. Co., a partnership consisting of Christiana Faessler, Elizabeth Faessler, Louis E. Faessler, and Graves R. Maupin, Moberly, Mo.

Original application July 5, 1934, Serial No. 733,732. Divided and this application November 4, 1935, Serial No. 48,145

8 Claims. (Cl. 29—90)

This invention relates to tools for finishing cylindrical bearing surfaces by rolling, and more particularly to a tool for rolling a plurality of such surfaces simultaneously, in a manner consistent with good factory production practice where precision must be coupled with speed and economy.

The invention has among its general objects, the production of a tool of the kind described, which will be simple in appearance, construction and operation, sturdy in design so as to perform its functions through reasonably long periods of time without loss of accuracy in operation, operates with a high degree of precision with economy, and which will be otherwise satisfactory and efficient for use wherever deemed applicable.

One of the objects of my invention is to produce a rolling tool adapted for rolling a plurality of aligned cylindrical bearing surfaces in unison, and wherein means are provided for adjusting the longitudinal spacing between adjacent roller units quickly, simply and accurately.

Another object of my invention is to provide a tool of the kind described, wherein means are included to substantially immediately collapse the rollers from their expanded to their contracted positions at the end of the rolling operation, and whereby the rapidity of operation of rolling is not hampered by any slow and cumbersome withdrawal of the rollers from the finished work.

A further object of my invention is to provide a tool of the kind described, having a plurality of sets of finishing rollers engageable with an expansion mandrel for actuating the rollers against the cylindrical surfaces being worked on, and in which the sets may be adjusted longitudinally relatively of one another, to thereby compensate for any wear or inaccuracies in diameter of said rollers or mandrel, and resulting in rolling all of the bearing surfaces to the same diameter.

Many other objects and advantages of the construction herein shown and described will be obvious to those skilled in the art to which this invention appertains, from the disclosures herein given.

To this end, my invention consists in the novel construction, arrangement and combination of parts herein shown and described, and the uses mentioned, as will be more particularly pointed out in the claims.

In the drawing, wherein like reference characters indicate like or corresponding parts throughout the views, The figure is a longitudinal cross-sectional view taken through the tool, showing the manner of rolling a pair of aligned bearing apertures in a given piece of work.

Referring more particularly to the drawing, wherein I have illustrated a preferred embodiment of my invention, A indicates a piece of work in which the finishing of the plurality of aligned cylindrical bearing surfaces 1—1 is further required, the article shown representing in this instance a piston and the pair of bearings indicating the wrist-pin bearings of the same. Unless these pin bearings are in perfect alignment and of exactly equal bore, the service of said piston will be comparatively inefficient, as it will unduly wear at said bearings, as well as cause other mechanical troubles after assembly into the motor. Further, interchangeability of the parts can not result, unless of course too great a clearance in fit at said mating points is permitted.

The ideal fit in such machine parts is when the cooperating parts are of such relative size that when a wrist pin of a given diameter is inserted through the pair of bores in succession, such insertion may be accomplished from either side of the piston as easily as from the other side, without any perceptible deflection of the pin in its passage through the spaced holes, nor any hesitancy, halting or catching of the pin at the second hole entrance.

Such accurate fitting has been relatively difficult to obtain when using the ordinary factory production methods, on account of prohibitive cost, but in the present invention the tool for accomplishing this sort of fit is primarily intended as a quantity production tool, and therefore its action is speeded up at desired points of travel through the holes being finished.

The tool is provided with an elongated mandrel 2, having a plurality of longitudinally spaced tapered portions 3—3 therealong, there being but a pair of such portions in the embodiment shown, inasmuch as this specific tool shown is intended for finishing wrist pin bearings or bushings. A shouldered enlargement 4 is provided at the rear end of said mandrel, and a longitudinally extending slot or keyway 5 is provided rearwardly therefrom. A threaded portion 6 is interposed on the mandrel between the extreme rear end and the shouldered portion, said extreme rear end of the mandrel being adapted to be power driven in any suitable manner, not shown.

A cage 8 is provided for each of the bearing surfaces to be rolled, and therefore only two such cages are needed for rolling the wrist pin bearings shown, it being understood however, that where the specific piece of work requires more than two sets of rollers, the tool therefor will be provided with such additional sets of rollers.

Each of the cages has its individual set of rollers 7 positioned therein and so arranged that said rollers may be bodily actuated either radially outwardly or inwardly of its cage in the course of operation of the device.

These rollers are arranged in the radial openings through the cages in which they are mounted, as shown, and the rollers are preferably arranged at a slight angle to the longitudinal axis of the cage, to thereby cause the rollers to self-feed through the bearings being rolled, in the manner shown in my prior Patent No. 1,619,479, of March 1, 1927, said rollers being so proportioned that they will have their tapered peripheral wall rolling smoothly on the like tapered portions of the mandrel.

A sleeve 9 is preferably detachably connected to the plurality of cages so as to carry all of the latter and actuate the same, said sleeve having a radially enlarged portion 10 adjacent its rear end, an integral collar 11 projecting therebeyond, and another enlargement 12 extending rearwardly of said collar. The bore of the sleeve is enlarged at its rear end 13 to receive the shouldered portion 4 of the mandrel.

Obviously, as the mandrel is shifted longitudinally to the left, relatively of the cages, the rollers will be actuated radially outwardly, and as the mandrel is shifted in the reverse direction, the rollers will drop to their lowermost or contracted positions.

A thrust bearing means, such as the mating sections 14 and 15, is arranged between the mandrel and the sleeve, the former mating section having an inwardly extending removable flange 16 at its forward end and another inwardly extending flange 17 at its rear end, and between which flanges the radial enlargement 11 may move longitudinally, the enlarged portion 10 of the sleeve passing through the first flange 16 while the enlargement 12 may pass through the second flange 17. A spring 18 may be interposed between the flange 11 and the flange 16 to normally keep the parts in the position shown, this spring being relatively light.

The mating section 15 is provided with an inwardly flanged portion 19 between which and the flange 17 of the first section there may be arranged a ball thrust bearing or other anti-friction element 20, there being a key 21 between the flange 19 and the key-way in the mandrel so that sliding movement of the mandrel and the sections 14 and 15, relatively of one another, is provided, but wherein relative rotational movement therebetween is prevented when said key is in place in the key-way.

A micrometer adjustment for small and accurate adjustments of feed, or expansion limits of the rollers, may be provided by the collar 22 that is rotatably secured to the section 15 by set screws 23 in the annular groove of the latter, one of said cooperating elements, as for example the element 15 having a mark inscribed thereon at its rear edge, and the element 22 having a series of annularly spaced equidistant markings thereon to register successively with said mark and whereby a predetermined movement of the mandrel, forwardly or rearwardly of the sleeve, may be had. A set screw 24 may be used to hold the element 22 fixed to the mandrel.

A clutch element 25 is arranged freely rotatable on the sleeve intermediate the section 14 and the cages, the same having its hub extending forwardly and rearwardly and of slightly less length than the distance between the rear end of the cages and the section 14, or the collar 27 interposed between said section 14 and element 25. A spring 26, or other suitable resilient means, is interposed between the rear end of the clutch and the collar 27, to normally urge said clutch forwardly on the sleeve into engagement with the cages, said spring being of relatively greater strength than the spring 18. The element 25 is preferably provided with a conically shaped periphery 28 extending from its forward face to adjacent the rear, and an oppositely tapered conical periphery 29 from the rear face to intersect the first conical surface, to thereby make a substantially V-shaped peripheral surface on said clutch.

One or more pawls or dogs 30 may be arranged in the path of movement of the clutch 25, said dogs each having one friction face 31 to engage with the conical face 28 of the clutch, and with a second face 32 to engage with the rear face 29 of the clutch. These dogs are pivotally secured to a fixed element B, so as to be movable to and from the clutch axis, and in order to maintain the dogs in frictional contact with the clutch, a coil spring 33 may be positioned to encircle the same to exert its pressure simultaneously on all of said dogs.

Assuming that the piston is in place ready for final rolling and smoothing of the pin holes and that the device is in position for such smoothing service, then the clutch will be in substantially the dotted line position shown, with the forward end of its hub portion abutting the rear edge of the rear cage 8, and with the spring 26 in its extended form.

While the clutch is in such position, the parts 14—15—22 and the mandrel will be moved to the right relatively of the sleeve 9, inasmuch as the pressure of said main spring is sufficiently strong to accomplish said relative shifting against the pressure of the lighter spring 18, the latter then being in its compressed position. With the parts in the relative positions set forth, the spring 26 presses the clutch forwardly against the rear of the rearward cage and the free or rear end of the portion 12 of the sleeve will accordingly be spaced from the adjacent thrust bearing 20.

Now, as the tool is shifted forwardly toward the piston, the forward face 28 of the clutch will be engaged by the rear faces 32 of the dogs. The dogs are in turn pressed radially inwardly toward the clutch by the encircling spring 33, and the resultant frictional engagement between said dogs and clutch will be sufficient to temporarily arrest further forward movement of the clutch and results in the main spring 26 being compressed to the form shown, the spring 18 being opened and exerting its pressure against the shoulder 11 of the sleeve and moving the latter, in turn, to the position shown in the drawing, so that said sleeve and the cages carried therewith are shifted to such position that the rollers are initially radially expanded to the desired predetermined degree for proper engagement with the pin openings through the piston.

Thus, the required rolling pressure is rapidly established and the rotation of the mandrel, preferably by power means, serves to carry the entire tool forwardly inasmuch as the rollers are self-feeding due to their angular relationship to the axis of the cages.

This feeding continues until the end of the rolling operation, and at which time the ridge of the clutch element will pass the ridge of the dogs, as shown in the dotted line positions of said cooperating elements, and at which time the pressure of the encircling spring 33 will augment the pressure of the spring 26 to force the clutch forwardly, first alone and then together with the sleeve, thereby shifting the cages forwardly relatively of the mandrel, and which of course causes said rollers to drop inwardly through the cage slots and permits of the rapid backing out of the tool from the finished holes. As the tool moves rearwardly, the dogs hold the clutch forwardly to maintain said rollers in their contracted position until the latter are entirely clear of their respective wrist pin holes in the piston, and a continued rearward movement results in the dogs snapping past said ridge of the clutch to again initially expand the rollers. By this time the next piston to be operated on is in place ready for engagement by the rollers.

The foregoing structure has been described and claimed in my earlier application, Serial No. 733,732, of which this is a divisional application.

In order to insure that the plurality of holes 1—1, such as the pair of wrist pin openings shown, will both be rolled to the same size precisely, even in the event that one set of the rollers or the tapered portions of the mandrel are incorrectly sized, or has become worn or otherwise altered in size, I have provided means to adjust each of the sets of rollers individually and independently of the other set, to thus compensate for said differences, and to this end have accordingly so arranged the adjacent cages that they are in longitudinally adjustable engagement, as for example by providing them with telescoping threaded interconnecting ends as at 34, the radially outermost end being split as at 37 to render it compressible thereat. In order to lock the adjacent cages in their adjusted relationship, a clamping ring 35 may be threaded on the one cage shown and provided with a beveled end to encircle and receive the correspondingly beveled split end 37 of the adjacent cage. Obviously, when the cages are in the position shown and the washer 35 is tightened down onto the beveled end of the adjacent cage, the compressible end of the latter will be wedged and contracted tightly into place. A lock nut 36 may also be provided in threaded engagement with the cage end, to be tightened up against the end of the beveled clamping ring 35.

If the rollers of the cage at the left, for example, should become worn, then in order to roll the pair of pin openings to the same size, said cage would be adjusted by moving it to the right the slight amount required and locking it in place. Subsequent rolling of the cages simultaneously would necessarily result in rolling of the pair of holes to the same size. Adjustment in the reverse direction would reduce the bore of the opening.

Having thus described my invention, it is obvious that various immaterial modifications may be made in the same without departing from the spirit of my invention; hence I do not wish to be understood as limiting myself to the exact form, arrangement, construction, and combination of parts herein shown and described, except as limited by the state of the art to which this invention appertains, and the claims hereunto appended.

What I claim as new and desire to secure by Letters Patent is:

1. In a tool for rolling a plurality of substantially equal curvature cylindrical bearing surfaces in unison, a mandrel having a plurality of longitudinally spaced tapered portions; a cage mounted on and engaging each of said individual tapered portions; expanding rollers in each cage and spaced apart a distance to correspond with the spacing between said bearing surfaces; means for adjusting said cages longitudinally; and means for actuating said rollers in unison to operably engage all of said bearing surfaces.

2. In a device of the kind described, for rolling a plurality of cylindrical bearing surfaces, a mandrel having a plurality of longitudinally spaced similarly tapered portions; a cage mounted to encircle each of said tapered portions; expanding rollers in each cage for engagement with a bearing surface to be finished; means for adjusting said cages longitudinally of one another to vary the rolling diameters of the rollers therein; and means for actuating said cages so that said rollers engage with said work.

3. In a device for finishing a plurality of longitudinally spaced cylindrical bearing surfaces, a mandrel having a plurality of longitudinally spaced tapered portions; a sleeve encircling said mandrel and movable longitudinally thereof; a roller cage carried by said sleeve for each of the bearing surfaces to be engaged; rollers in each of said cages; means for adjustably engaging the adjacent cages to vary the longitudinal distance therebetween and vary the effective rolling diameters of the rollers; means for locking the cages at their adjusted positions; and means for feeding said rollers simultaneously against all of said bearing surfaces.

4. In a device of the kind described, a sleeve; a mandrel freely rotatable therein; a plurality of cages rotatable with said sleeve; expanding rollers in each of said cages for work-engagement and rotatably engageable with said mandrel; means for interconnecting adjacent cages to adjustably vary the spacing therebetween and vary the rolling diameter of the rollers; and means for feeding said mandrel and sleeve in a predetermined manner.

5. In a device of the kind described, for rolling a plurality of cylindrical bearing surfaces in unison, a mandrel having a plurality of longitudinally spaced tapered portions; a cage mounted to encircle each of said tapered portions; expanding rollers rotatable in each cage, engageable with the tapered portions of said mandrel for engagement with said bearing surfaces; means for adjustably interconnecting said cages longitudinally of one another to vary the effective rolling diameter of one cage relatively of the other; and means for driving said mandrel and cages to rotate all of said rollers in unison into engagement with said cylindrical bearing surfaces.

6. In a device of the kind described, a sleeve; a mandrel freely rotatable therein and having a plurality of longitudinally spaced tapered portions; cages secured to said sleeve, one for each of said tapered portions; expanding rollers in said cages and respectively rotatably engageable with the tapered portions of said mandrel; and means for adjusting the adjacent cages to longitudinally shift the bearing of the rollers on said tapered portions and thereby vary the effective rolling diameters of the rollers.

7. In a tool for rolling a pair of cylindrical bearing surfaces, a mandrel having a pair of tapered portions; a sleeve rotatably encircling said mandrel; a pair of roller units longitudinally spaced apart on said sleeve and rotatably drivingly engageable with said tapered portions respectively of said mandrel to operably roll said pair of bearing surfaces; and means for adjustably shifting one of said roller units longitudinally of the other independently of its engagement with said mandrel so as to set the adjusted roller unit to vary the resultant effective rolling diameter of said unit.

8. In a tool for rolling a pair of cylindrical surfaces, a mandrel having a pair of tapered portions; a pair of roller units longitudinally spaced apart and rotatably drivingly engageable with said tapered portions respectively of said mandrel to operably roll said pair of cylindrical surfaces simultaneously; and means for adjustably interconnecting said pair of roller units so as to permit shifting of one of the units longitudinally of the other independently of engagement with said mandrel, to thereby set the adjusted roller units to vary its resultant effective rolling diameter.

GRAVES R. MAUPIN.